United States Patent
Furukawa et al.

(10) Patent No.: US 8,264,450 B2
(45) Date of Patent: Sep. 11, 2012

(54) ILLUMINATING APPARATUS AND DISPLAY APPARATUS

(75) Inventors: Norimasa Furukawa, Tokyo (JP); Jun Shimizu, Miyagi (JP)

(73) Assignee: Sony Corporation (JP)

( * ) Notice: Subject to any disclaimer, the term of this patent is extended or adjusted under 35 U.S.C. 154(b) by 742 days.

(21) Appl. No.: 12/384,876

(22) Filed: Apr. 9, 2009

(65) Prior Publication Data

US 2009/0295707 A1   Dec. 3, 2009

(30) Foreign Application Priority Data

Apr. 15, 2008   (JP) .................................. 2008-105768

(51) Int. Cl.
*G09G 3/36* (2006.01)
*G02F 1/1347* (2006.01)

(52) U.S. Cl. .............. 345/102; 345/89; 349/74; 349/75; 349/76; 349/77

(58) Field of Classification Search ..................... 345/89, 345/102; 349/48, 59, 61, 85, 89, 96–105, 349/69–77, 114–123; 353/8, 20

See application file for complete search history.

(56) References Cited

U.S. PATENT DOCUMENTS

| | | | | |
|---|---|---|---|---|
| 5,581,383 A * | 12/1996 | Reichel et al. | ............... | 349/116 |
| 5,686,979 A * | 11/1997 | Weber et al. | ................... | 349/96 |
| 6,429,914 B1 * | 8/2002 | Kubota et al. | ................... | 349/86 |
| 6,697,138 B2 * | 2/2004 | Ha et al. | ........................ | 349/114 |
| 6,917,404 B2 * | 7/2005 | Baek | ............................. | 349/114 |
| 7,542,117 B2 * | 6/2009 | Murata et al. | .................. | 349/115 |
| 7,633,566 B2 * | 12/2009 | Utsunomiya et al. | ........... | 349/12 |
| 7,682,899 B2 * | 3/2010 | Natori et al. | .................. | 438/257 |
| 7,683,899 B2 * | 3/2010 | Hirakata et al. | .............. | 345/211 |
| 7,956,957 B2 * | 6/2011 | Ishitani et al. | ................. | 349/103 |
| 2002/0036608 A1 * | 3/2002 | Hirakata et al. | ................ | 345/87 |
| 2002/0113927 A1 * | 8/2002 | Ha et al. | ........................ | 349/113 |
| 2006/0082706 A1 * | 4/2006 | Choo et al. | .................... | 349/114 |
| 2007/0146847 A1 * | 6/2007 | Sakaguchi et al. | ............. | 359/29 |
| 2007/0177084 A1 * | 8/2007 | Ishitani et al. | ................. | 349/117 |
| 2007/0279374 A1 * | 12/2007 | Kimura et al. | ................ | 345/102 |

FOREIGN PATENT DOCUMENTS

JP   2001-266605   9/2001

* cited by examiner

*Primary Examiner* — Prabodh M Dharia
(74) *Attorney, Agent, or Firm* — Lerner, David, Littenberg, Krumholz & Mentlik, LLP

(57) ABSTRACT

The present invention provides an illuminating apparatus locally reducing light intensity without depending on the configuration of a light source itself. An illuminating apparatus used as a backlight of a display apparatus having a liquid crystal display panel with a pair of first polarizers, including a light source and a liquid crystal light control panel. The liquid crystal light control panel has a pair of second polarizers and suppresses amount of transmission of light from the light source, thereby allows the light from the light source to have such a light intensity distribution along a plane that light intensity is locally reduced. The polarization degree in the second polarizers is optimized so that transmission light amount ratio of the second polarizers is lower than that of the first polarizers.

8 Claims, 20 Drawing Sheets

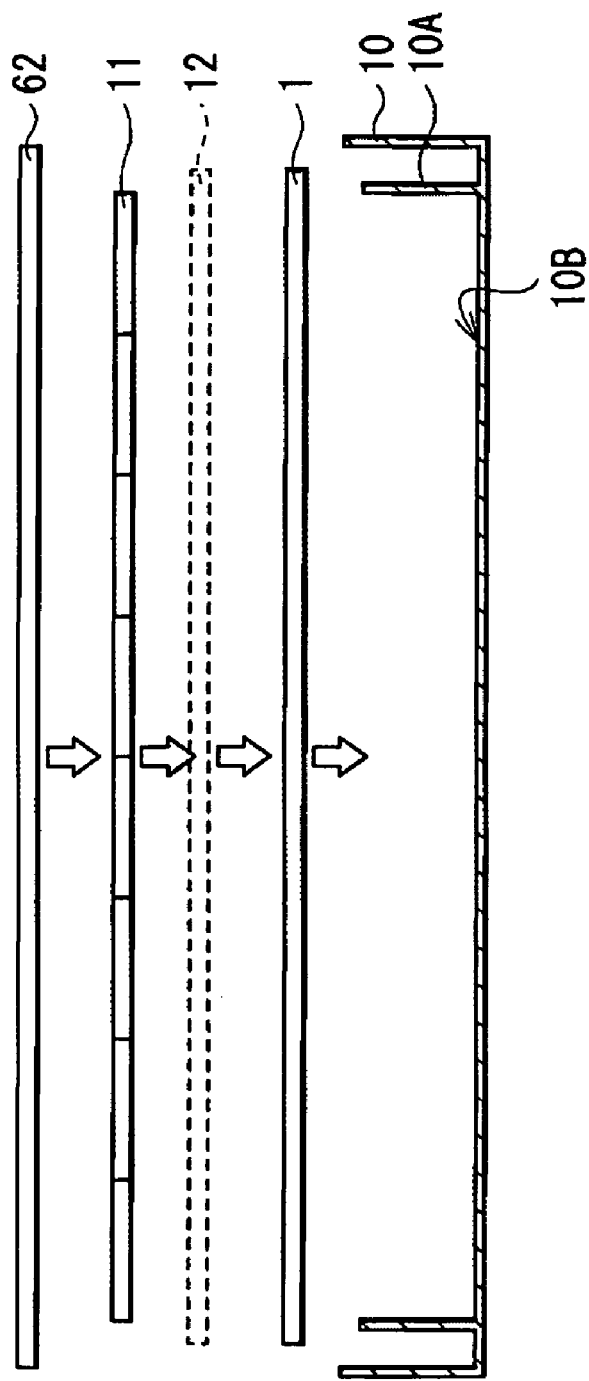
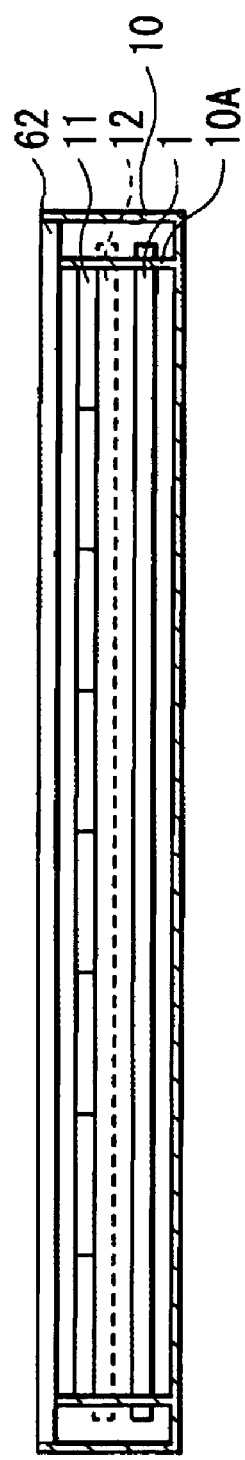
FIG. 4A
FIG. 4B

|  | | COMPARATIVE EXAMPLE 1 | EXAMPLE 1 |
|---|---|---|---|
|  | | TRANSMITTANCE | |
| a | POLARIZER 2A | 0.388 | 0.44 |
| b | ITO 3A | 0.9 | 0.9 |
| c | LC | 0.95 | 0.95 |
| d | ITO 3B | 0.9 | 0.9 |
| e | POLARIZER 2B | 0.388 | 0.44 |
| a×b×c×d×e | TOTAL TRANSMITTANCE (ACCUMULATED TOTAL) | 0.12 | 0.15 |

→ 1.286 TIMES (28%UP)

FIG. 21

ILLUMINATING APPARATUS AND DISPLAY APPARATUS

The present application claims priority from Japanese Patent Application No. JP 2008-105768, filed in the Japanese Patent Office on Apr. 15, 2008, the entire content of which is incorporated herein by reference.

BACKGROUND OF THE INVENTION

1. Field of the Invention

The present invention relates to an illuminating apparatus capable of varying a light intensity distribution in a plane and a display apparatus using the illuminating apparatus.

2. Description of the Related Art

For example, as a light source of a backlight of a liquid crystal display apparatus, a light source using a stick-shaped fluorescent tube such as CCFL (Cold Cathode Fluorescent Lamp), EEFL (External Electrodes Fluorescent Lamp), or HCFL (Hot Cathode Fluorescent Lamp) is conventionally known. A backlight using a stick-shaped ultraviolet lamp as a light source, converting ultraviolet light to visible light, using the visible light as illumination light is also proposed (refer to Japanese Unexamined Patent Application Publication No. 2001-266605).

Recently, a partial-drive-type backlight is developed in which a number of point light sources such as LEDs (Light Emitting Diodes) are used as a light source, a light emission plane is divided in a plurality of partial light emission regions, and light emission control is performed in the partial light emission regions independently of each other. A liquid crystal display apparatus using the backlight of the partial-drive-type is developed. In the liquid crystal display apparatus, light intensity of the backlight is partially changed according to a video image to be displayed, so that the light intensity reproduction range (dynamic range) exceeding the limit contrast ratio in liquid crystal display is realized. One of concrete methods is a method of reducing light intensity of black by partially reducing (turning off) the background light of a portion of displaying a dark image. The technique is commonly called local dimming.

SUMMARY OF THE INVENTION

In the conventional backlight of the partial-drive-type, light source elements themselves are disposed in a number of regions, and drive circuits are connected to the light source elements. By controlling the light emission amount of the light source itself, the light intensity is varied in each of the partial light emission regions. Concretely, in the case of making the partial light emission region dark, it is sufficient to decrease the drive current to the light source.

However, in designing, the maximum number of dividing the region (the smallest size of the region which is made dark) is limited in reality due to physical limitation of the number of light source elements which is used and physical limitation of arrangement of the light source elements. On the other hand, in the case of partially decreasing light intensity more finely, it is necessary to considerably increase the number of light source elements used and increase the division number. Since light control of the light source itself is performed according to the division number, the number of drive circuits also increases. As described above, in the case of obtaining the larger division number, the physical limitation and economic limitation arise.

In the conventional partial drive type, it is necessary to divide the light source itself finely. Consequently, in a configuration of disposing about 20 line light sources such as CCFLs, it is difficult to divide the screen in a two-dimensional matrix of rows and columns. Conventionally, in the case of using line light sources such as CCFLs, light intensity is controlled only in the unit of the horizontal direction or the vertical direction. In a combination with a video signal having a two-dimensional space frequency in the vertical and horizontal directions, the effect of the partial-drive-type is not easily produced. It is therefore improper to use line light sources. Normally, by using LEDs of mainly point light sources or the like, the light sources are dividedly disposed in a number of regions in a two-dimensional matrix, and the light emission control independently in the horizontal and vertical directions is realized.

It is therefore desirable to provide an illuminating apparatus and a display apparatus capable of locally reducing light intensity without depending on the configuration of a light source element itself.

An illuminating apparatus as an embodiment of the present invention is used as a backlight of a display apparatus having a liquid crystal display panel with a pair of first polarizers, has: a light source; and a liquid crystal light control panel having a pair of second polarizers and suppressing amount of transmission of light from the light source, thereby allowing the light from the light source to have such a light intensity distribution along a plane that light intensity is locally reduced. Polarization degree in the second polarizers is optimized so that transmission light amount ratio of the second polarizers is lower than that of the first polarizers.

A display apparatus as an embodiment of the present invention has an illuminating device including a light source and a liquid crystal light control panel; and a display section including a liquid crystal display panel with a pair of first polarizers and displaying a video image based on an input video signal through using illumination light from the illuminating apparatus as display light. As the illuminating device, the above-described illuminating apparatus as an embodiment of the invention is employed.

In the illuminating apparatus and the display apparatus of an embodiment of the present invention, by regulating a transmission amount of light generated from a light source by a liquid crystal light control panel, light intensity of light generated from the light source is locally decreased in the plane. Consequently, for example, without disposing light sources in a number of regions or without controlling the light emission amount of the light source itself, the light intensity is locally reduced. The liquid crystal light control panel in the illuminating apparatus of an embodiment of the present invention is not requested to have a high contrast ratio unlike a normal liquid crystal display panel, so that transmission light amount ratio CR of a pair of polarizers in the liquid crystal light control panel is intentionally set to be lower than that of a normal liquid crystal display panel. To set the transmission light amount ratio CR in a predetermined range, the polarization degree of the pair of polarizers in the liquid crystal light control panel is optimized by being intentionally, in a permissible range, deteriorated (lowered more than that of a normal liquid crystal display panel). By intentionally deteriorating the polarization degree, although the contrast ratio becomes lower than that of the normal liquid crystal display panel, transmittance improves. As a result, while suppressing insertion loss (light transmission loss) which occurs when the liquid crystal light control panel is disposed, the light amount is adjusted.

In the illuminating apparatus and the display apparatus of an embodiment of the present invention, by regulating the transmission amount of light generated from the light source by the liquid crystal light control panel, the light intensity of the light emitted from the light source is locally decreased in the plane. Consequently, for example, without increasing the number of light source elements or without controlling the light emission amount of the light source itself, the light intensity is locally decreased at low cost without depending on the configuration of the light source element itself. By realizing optimization by intentionally, in a permissible range, deteriorating (decreasing) the polarization degree of the pair of polarizers in the liquid crystal light control panel more than that of a normal liquid crystal display panel, the transmission light amount ratio CR is suppressed in a predetermined range required for light control. Therefore, while realizing a contrast ratio lower than that of the normal liquid crystal display panel, the transmittance is improved. As a result, while suppressing insertion loss which occurs when the liquid crystal light control panel is disposed, the light amount is adjusted.

Other and further objects, features and advantages of the invention will appear more fully from the following description.

BRIEF DESCRIPTION OF THE DRAWINGS

FIGS. 4A and 4B are cross sections showing a configuration example of the illuminating apparatus as the first embodiment of the invention.

FIG. 21 is an explanatory diagram showing an example of transmittance of an entire liquid crystal light control panel together with a comparative example.

DETAILED DESCRIPTION OF THE PREFERRED EMBODIMENTS

Embodiments of the present invention will be described in detail hereinbelow with reference to the drawings.

First Embodiment

Figure 1:
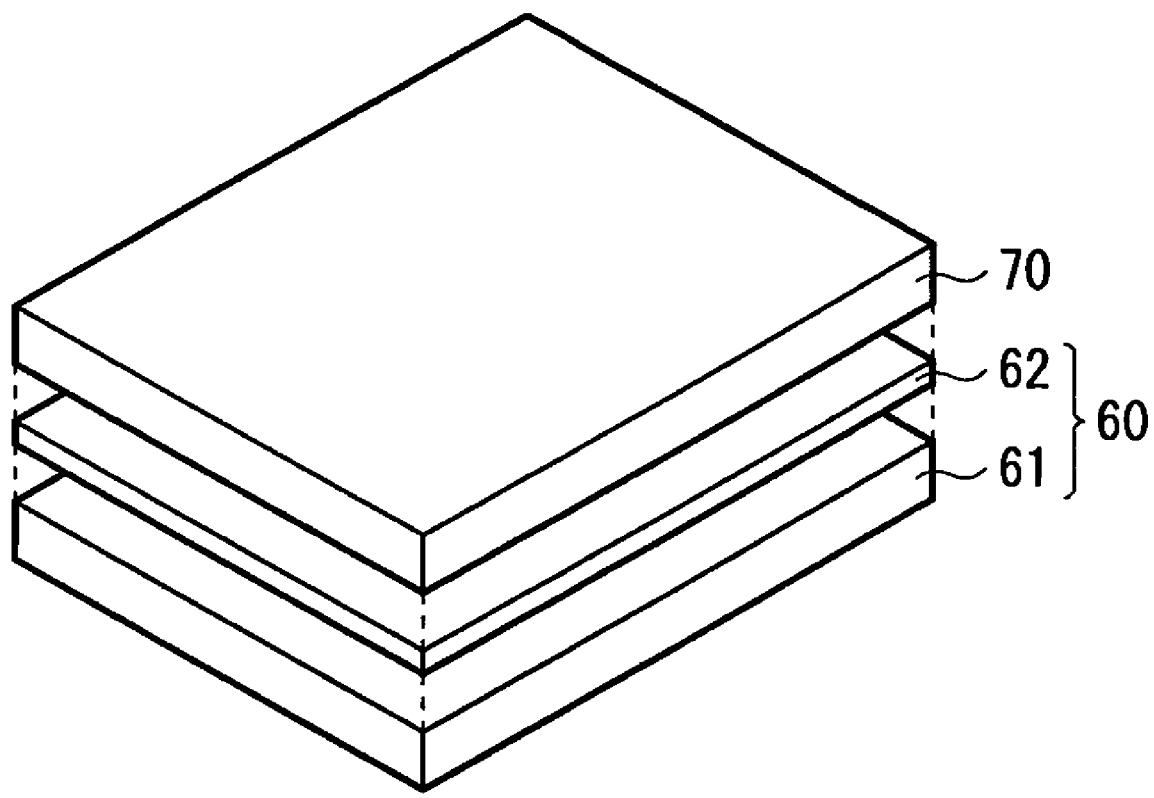
FIG. 1 is a general configuration diagram showing an example of a display apparatus using an illuminating apparatus as a first embodiment of the present invention.

FIG. 1 shows a configuration example of a display apparatus in a first embodiment of the present invention. The display apparatus is a liquid crystal display apparatus of a transmission type and has a backlight 60 as an illuminating apparatus and a liquid crystal display panel 70. The liquid crystal display panel 70 is a display part for displaying a video image based on an input video signal Vin using illumination light from the backlight 60 as display light. The backlight 60 has a light source unit 61 and a diffusion part 62. The diffusion part 62 is obtained by, for example, stacking a plurality of plate-shaped optical members such as diffusers having uniform diffusion degree or optical sheets for improving general light intensity.

Figure 2:
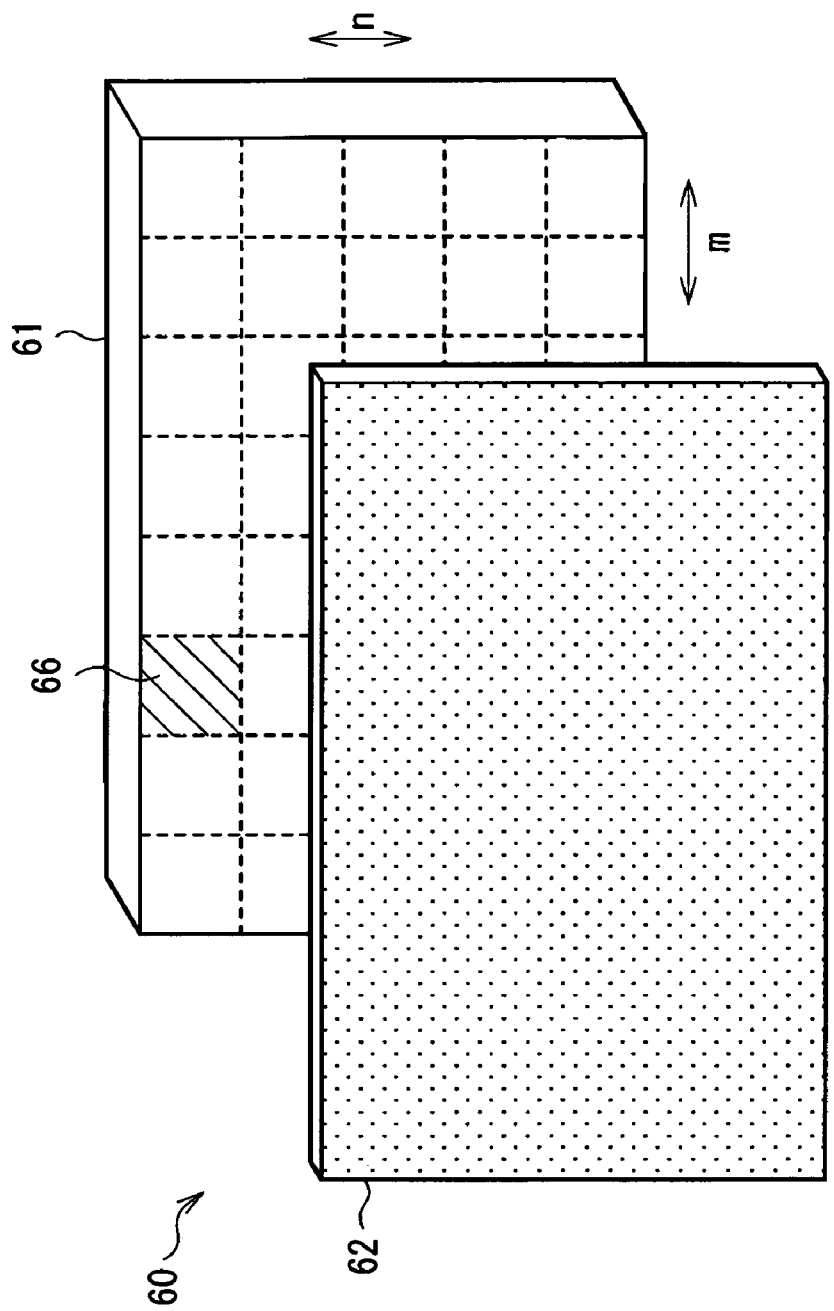
FIG. 2 is a perspective view showing a schematic configuration of the illuminating apparatus as the first embodiment of the invention.

The light source unit 61 in the backlight 60 has, as shown in FIG. 2, a plurality of partial light emission regions 66 obtained by dividing a light emission area in the in-plane direction ("n" in the vertical direction x "m" in the horizontal direction=K piece (n, m=integer of 2 or larger)). In the light source unit 61, the partial light emission regions 66 is light-controlled independently of each other in accordance with the input video signal Vin. In the embodiment, light control on each of the partial light emission regions 66 is performed by a liquid crystal light control panel 11 to be described, which is disposed in the light source unit 61.

Figure 3:
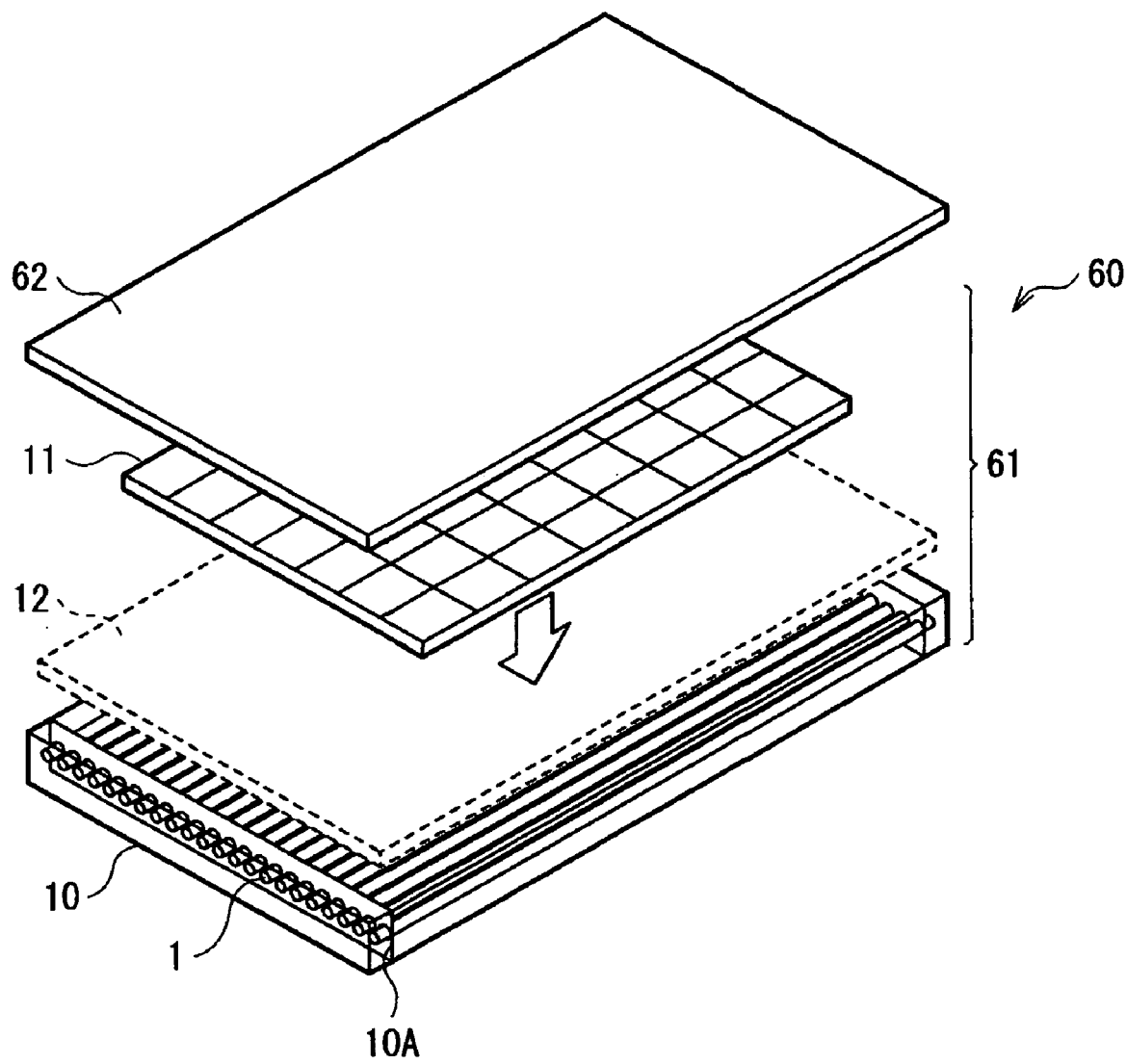
FIG. 3 is an exploded perspective view showing a configuration example of the illuminating apparatus as the first embodiment of the invention.

FIG. 3 and FIGS. 4A and 4B show a more concrete configuration example of the backlight 60. FIGS. 3 and 4A are exploded views of components of the backlight 60. The backlight 60 has a lamp house 10 as a casing. In the lamp house 10, a plurality of light sources 1 and the liquid crystal light control panel 11 as components of the light source unit 61 are housed in order. Bottom face 10B of the lamp house 10 serves as a reflection face for reflecting light from the light sources 1. The diffusion part 62 is attached to the top face of the lamp house 10. The light source 1 is a stick-shaped line light source for emitting white light such as CCFL, EEFL, or HCFL. The light source 1 and the liquid crystal light control panel 11 are housed in the lamp house 10 with their both ends being supported by a lamp holder 10A. A diffusion member 12 different from the diffusion part 62 on the top face may be disposed between the light sources 1 and the liquid crystal light control panel 11.

Figure 5:
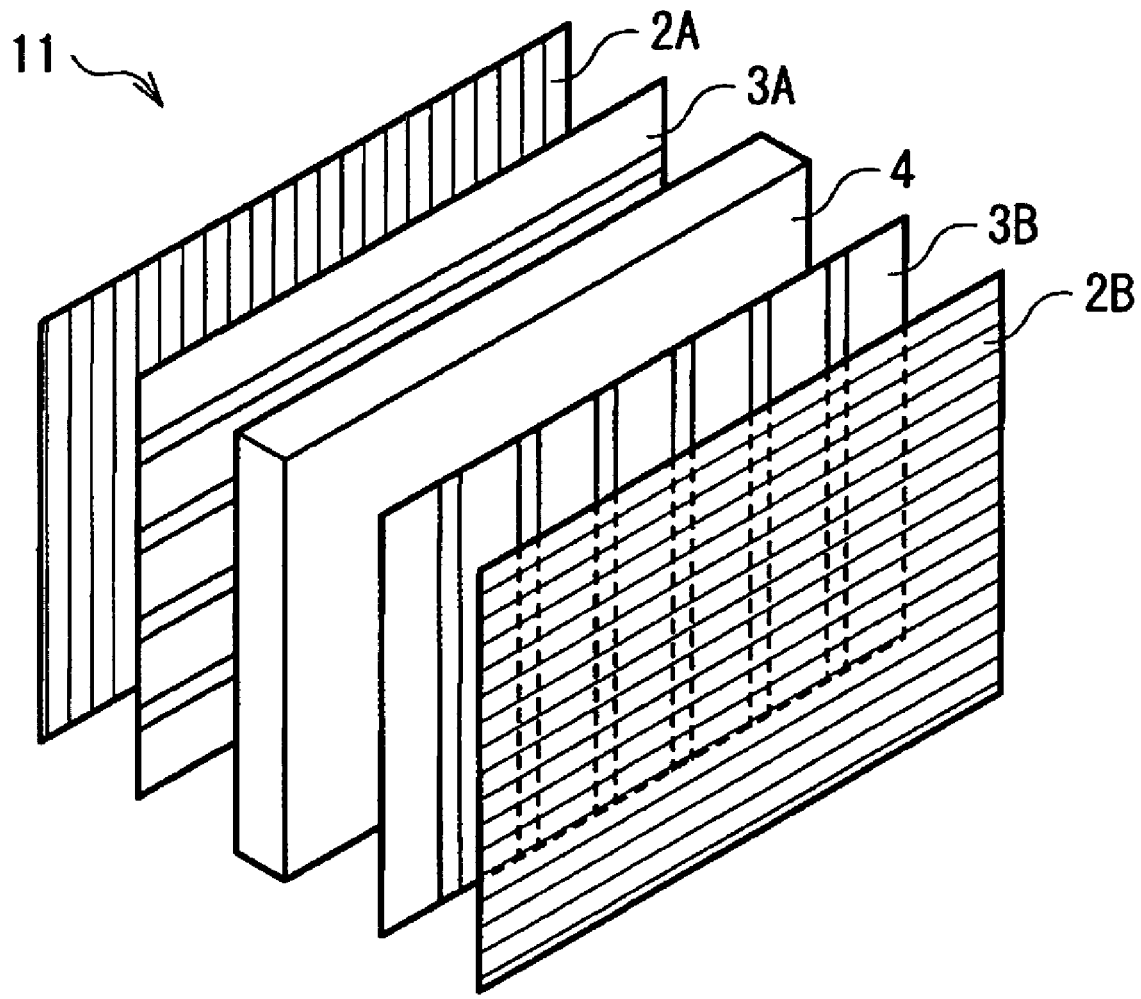
FIG. 5 is an exploded perspective view showing a configuration example of a liquid crystal light control panel in the first embodiment of the invention.

FIG. 5 shows a concrete configuration example of the liquid crystal light control panel 11. The liquid crystal light control panel 11 is, for example, a liquid crystal panel of the passive type and has a configuration that a liquid crystal 4 is sandwiched by a pair of ITO (Indium Tin Oxide) films 3A and 3B as transparent conductive films, and both sides of the pair of ITO films 3A and 3B are sandwiched by a pair of polarizers 2A and 2B. The pair of ITO films 3A and 3B are disposed so that electrodes are orthogonal to each other, and drive the liquid crystal 4 in a two-dimensional matrix state. The pair of polarizers 2A and 2B are disposed so that their polarizing axes are in crossed-nicols arrangement.

Figure 6:
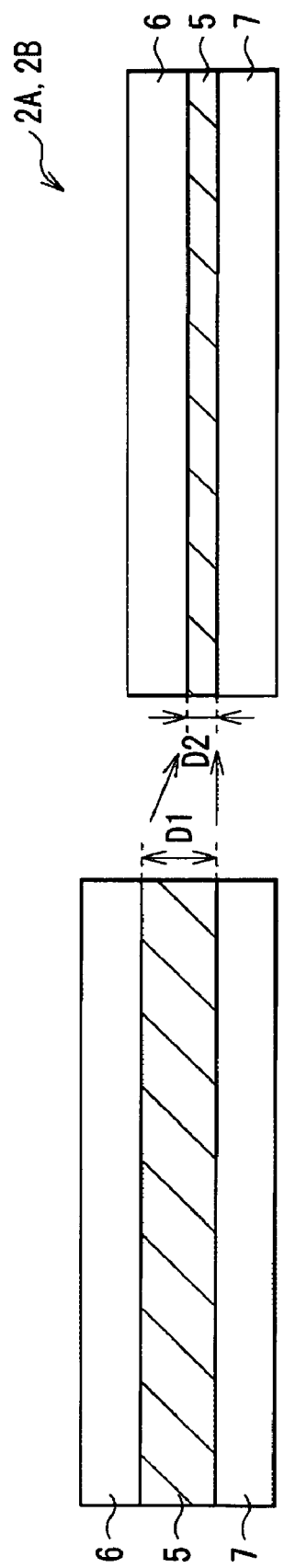
FIG. 6 is a cross section showing a configuration example of a polarizer in the liquid crystal light control panel in the first embodiment of the invention.

Each of the pair of polarizers 2A and 2B has a configuration that, for example, as shown in FIG. 6, PVA (polyvinyl alcohol) layer 5 as a polarizer body layer is sandwiched by TAC layers (triacetylcellulose) 6 and 7 as protection films. By impregnating the PVA layer 5 with iodine, a polarizing effect is obtained. In the embodiment, as will be described later, the thickness of the PVA layer 5 is set to thickness D2 which is smaller than thickness D1 used for a normal liquid crystal display panel, thereby intentionally deteriorating the polarization degree of the pair of polarizers 2A and 2B.

Although not shown, the liquid crystal display panel 70 (FIG. 1) in the embodiment also has a pair of first polarizers. The polarization degree of the pair of polarizers 2A and 2B as second polarizers of the liquid crystal light control panel 11 is intentionally set to be lower than that of the pair of polarizers of the liquid crystal display panel 70. In the embodiment, "the normal liquid crystal display panel" corresponds to the liquid crystal display panel 70.

The liquid crystal light control panel 11 is configured so that a transmission light amount is limited in each of the plurality of regions divided in a two-dimensional matrix (the partial light emission regions 66 in FIG. 2). According to the input video signal Vin, the light intensity of light emitted from the light source 1 is decreased locally in the plane on the divided region basis.

Figure 7:
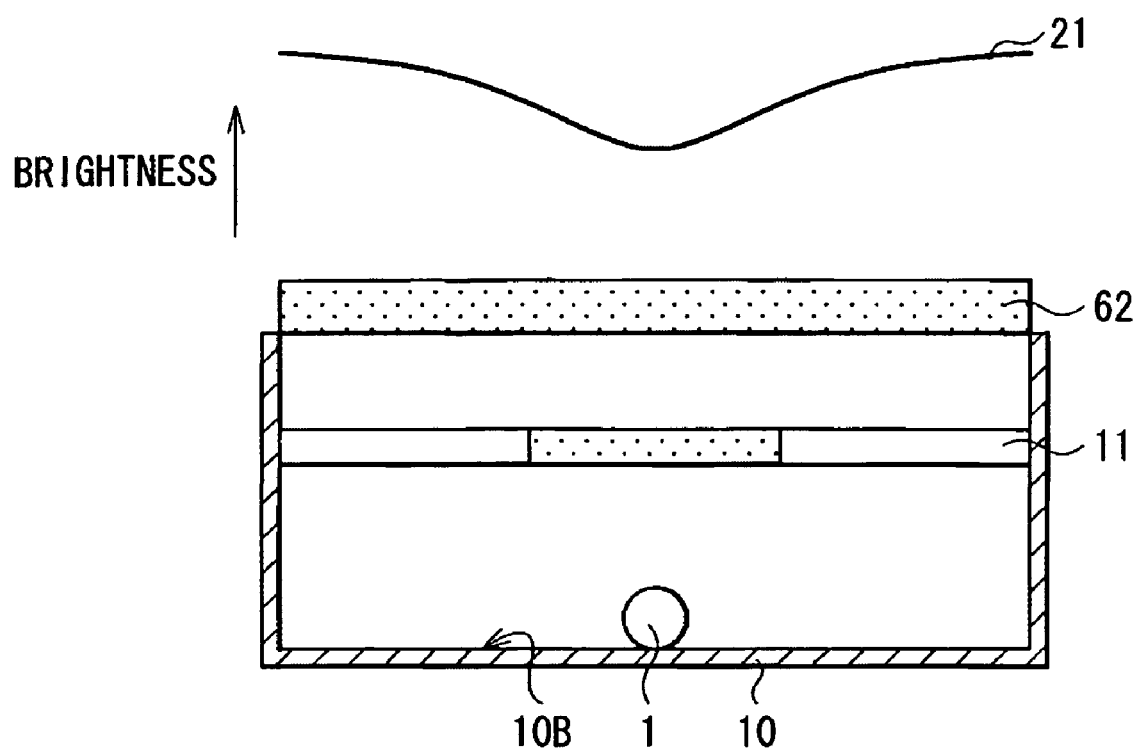
FIG. 7 is an explanatory diagram of a first light intensity distribution of the illuminating apparatus in the first embodiment of the invention.
Figure 8:
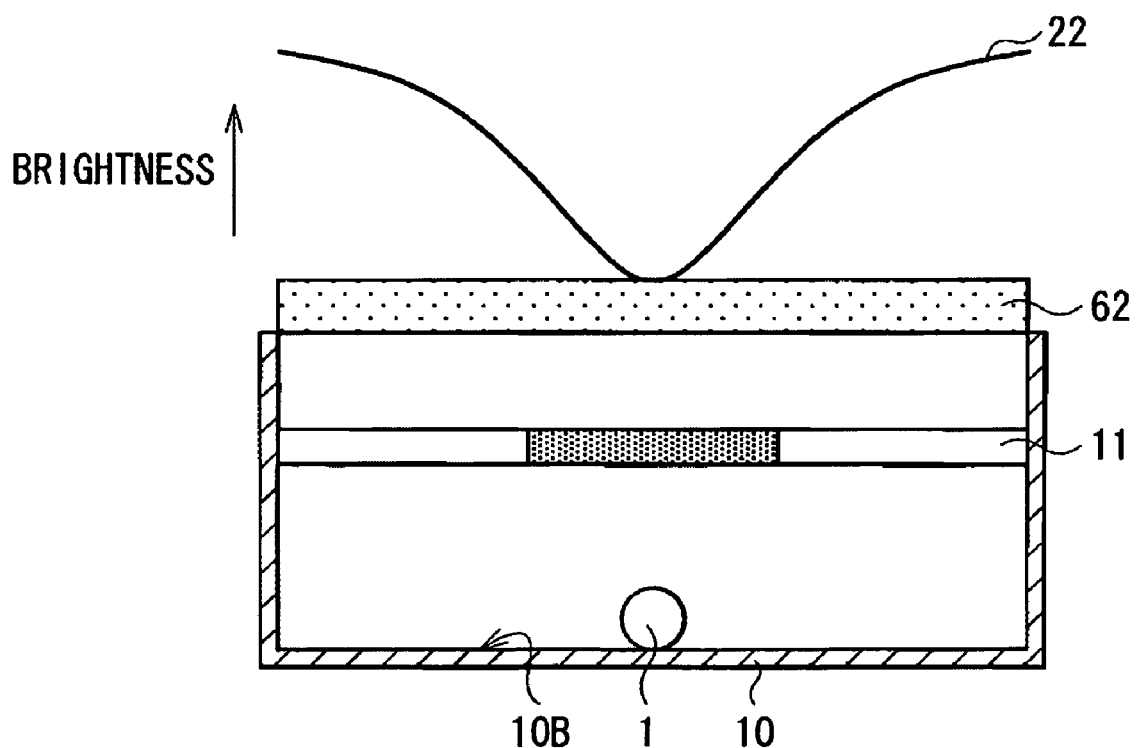
FIG. 8 is an explanatory diagram of a second light intensity distribution of the illuminating apparatus in the first embodiment of the invention.
Figure 9:
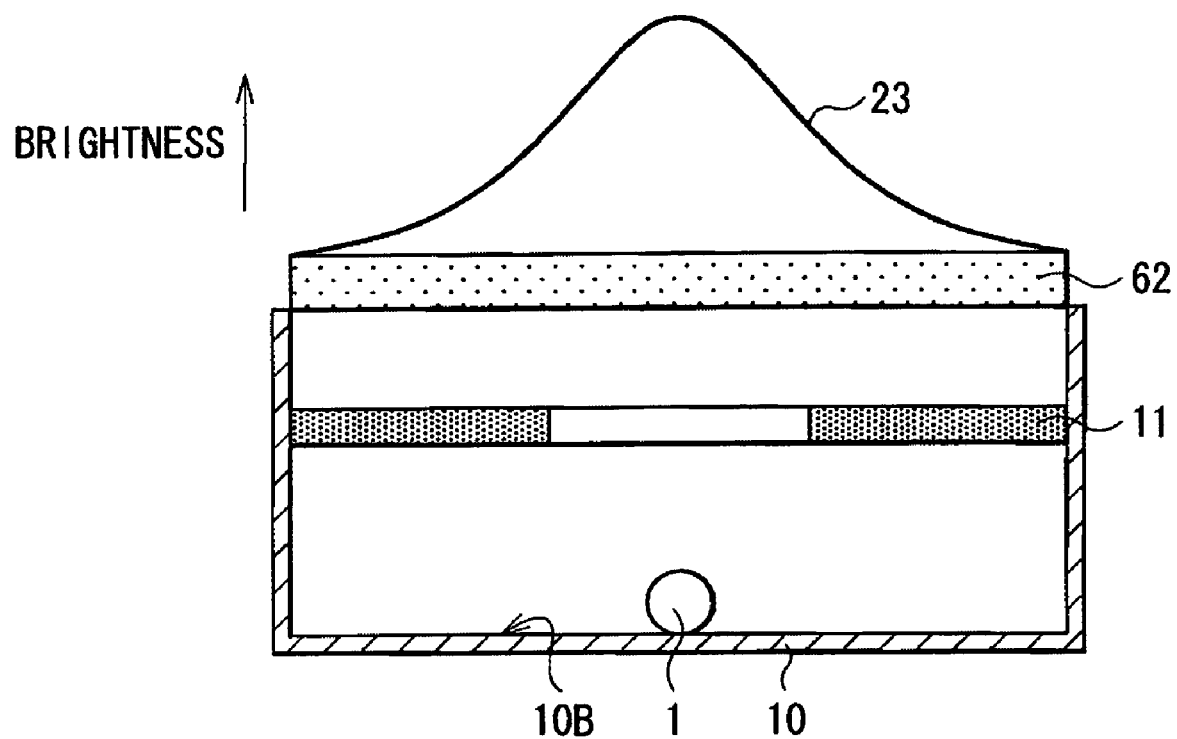
FIG. 9 is an explanatory diagram of a third light intensity distribution of the illuminating apparatus in the first embodiment of the invention.

FIGS. 7 to 9 show the principle of light control performed by the liquid crystal light control panel 11. In FIGS. 7 to 9, the configuration of the backlight 60 is simplified to explain the principle. It is assumed that the liquid crystal light control panel 11 has three regions; a center region and right and left regions as divided regions. The states of the divided regions of the liquid crystal light control panel 11 are assumed as a non-shielded state (transmission state), an intermediate shield state (halftone state), and a maximum shield state. The light source 1 emits light with predetermined light intensity.

FIG. 7 shows a light intensity distribution (first light intensity distribution 21) in the case where the center divided region in the liquid crystal light control panel 11 is set in the intermediate shield state, and the right and left divided regions are set in the non-shield state. In this state, the light intensity in the right and left regions is set to almost normal light intensity, and the light intensity in the center region is set slightly lower. FIG. 8 shows a light intensity distribution (second light intensity distribution 22) in the case where the center divided region is set in the maximum shield state, and the right and left divided regions are set in the non-shield state. In the state of FIG. 8, the light intensity in the center region is set lower than that in the first light intensity distribution 21 of FIG. 7. FIG. 9 shows a light intensity distribution (third light intensity distribution 23) in the case where the center divided region is set in the non-shield state, and the right and left divided regions are set in the maximum shield state. In the state of FIG. 9, the light intensity in the center region is set almost normal light intensity, and that in the right and left regions is set to be lower.

In the backlight 60 in the embodiment as described above, by changing the shield state of each of the divided regions of the liquid crystal light control panel 11 in a state where the light sources 1 are allowed to emit light with predetermined light intensity, illumination light having various light intensity distributions is obtained. Since the diffusion part 62 is interposed between the backlight 60 and the liquid crystal light control panel 11, polarization in the liquid crystal light control panel 11 is prevented, and the light may be used as scattered light. The light is diffused by the diffusion part 62, thereby enabling a moderate blur amount to be caused.

The region division number of the liquid crystal light control panel 11 (the division number of the partial light emission regions 66 in FIG. 2) is set to be sufficiently smaller than the number of pixels of the liquid crystal display panel 70 (for example, the number of pixels of the liquid crystal display panel 70 is 1,000,000 pixels while the surface division number of the light source unit 61 is tens to hundreds). In other words, the size of the divided region in the liquid crystal light control panel 11 is set to be sufficiently larger than that of one pixel in the liquid crystal display panel 70.

In the display apparatus in the embodiment, illumination light from the light source unit 61 is emitted, with the diffusion part 62 in between, to the rear surface side of the liquid crystal display panel 70. The liquid crystal display panel 70 modulates the illumination light on the basis of the input video signal Vin and displays a video image. The luminance of the video image finally displayed is conceptually obtained by combining the luminance of a light emission plane in the light source unit 61 (light emission plane of the liquid crystal light control panel 11) in which the diffusion degree of the diffusion part 62 is considered and the luminance of the display surface of the liquid crystal display panel 70.

Figure 10:
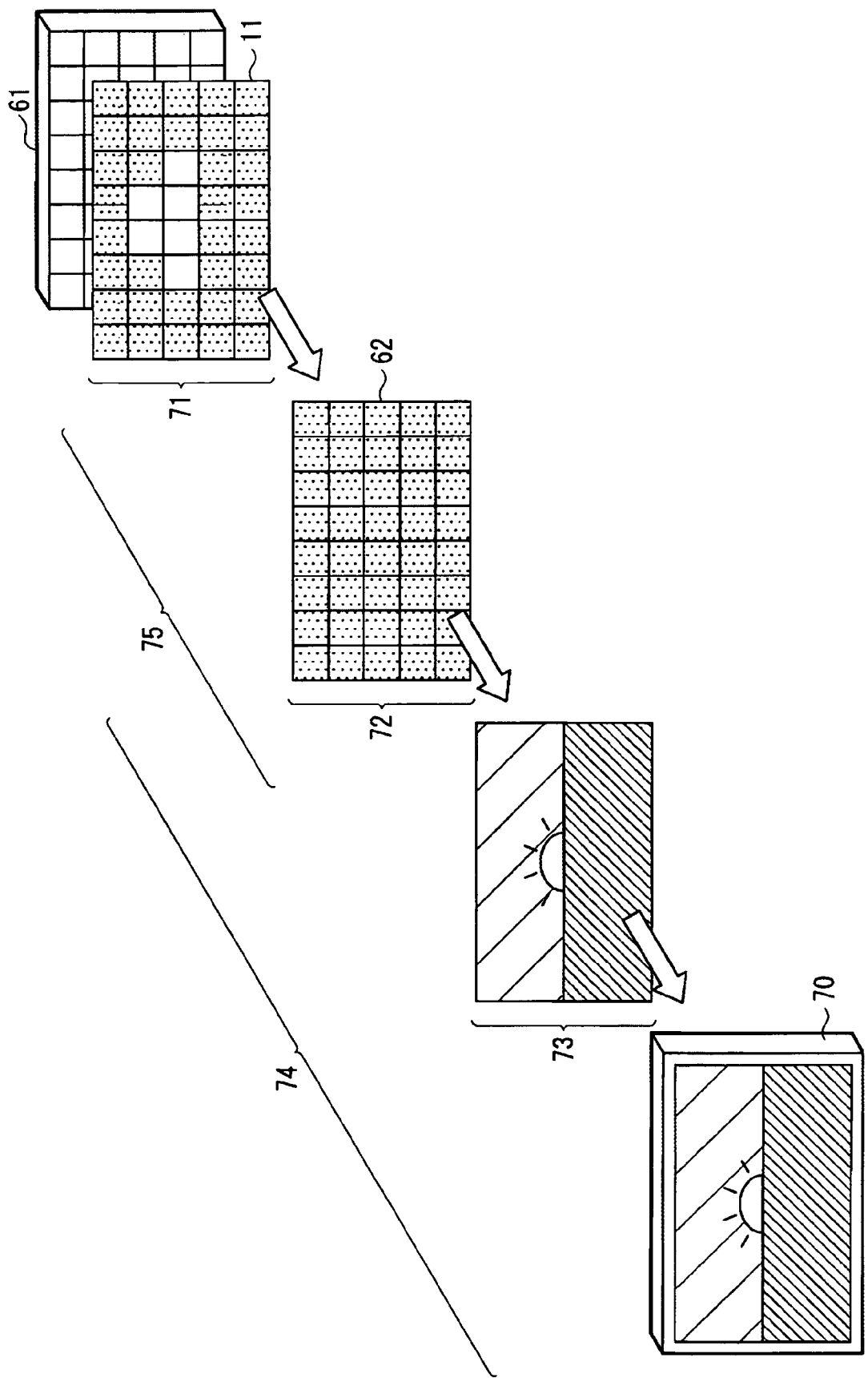
FIG. 10 is an explanatory diagram showing the overlapping relation of luminance images in a light source part, a diffusion part, and a liquid crystal panel.

FIG. 10 schematically shows a luminance image in each of the light source unit 61, the diffusion part 62, and the liquid crystal display panel 70. In the display apparatus, as shown in the diagram, a composite image 74 obtained by physically overlapping (combining through multiplication of) a light emitting face image 75 of the entire backlight 60 and a panel face image 73 of the single liquid crystal display panel 70 is a video image finally observed. The light emitting face image (backlight face image 75) of the entire backlight 60 is composition of a light emitting face image 71 formed by the light source unit 61 and a diffusion face image 72 formed by the diffusion part 62. In the embodiment, the diffusion part 62 is a uniform diffusion face, so that a substantial luminance distribution (contrast in the plane) is determined by the liquid crystal light control panel 11 of the light source unit 61.

Figure 11:
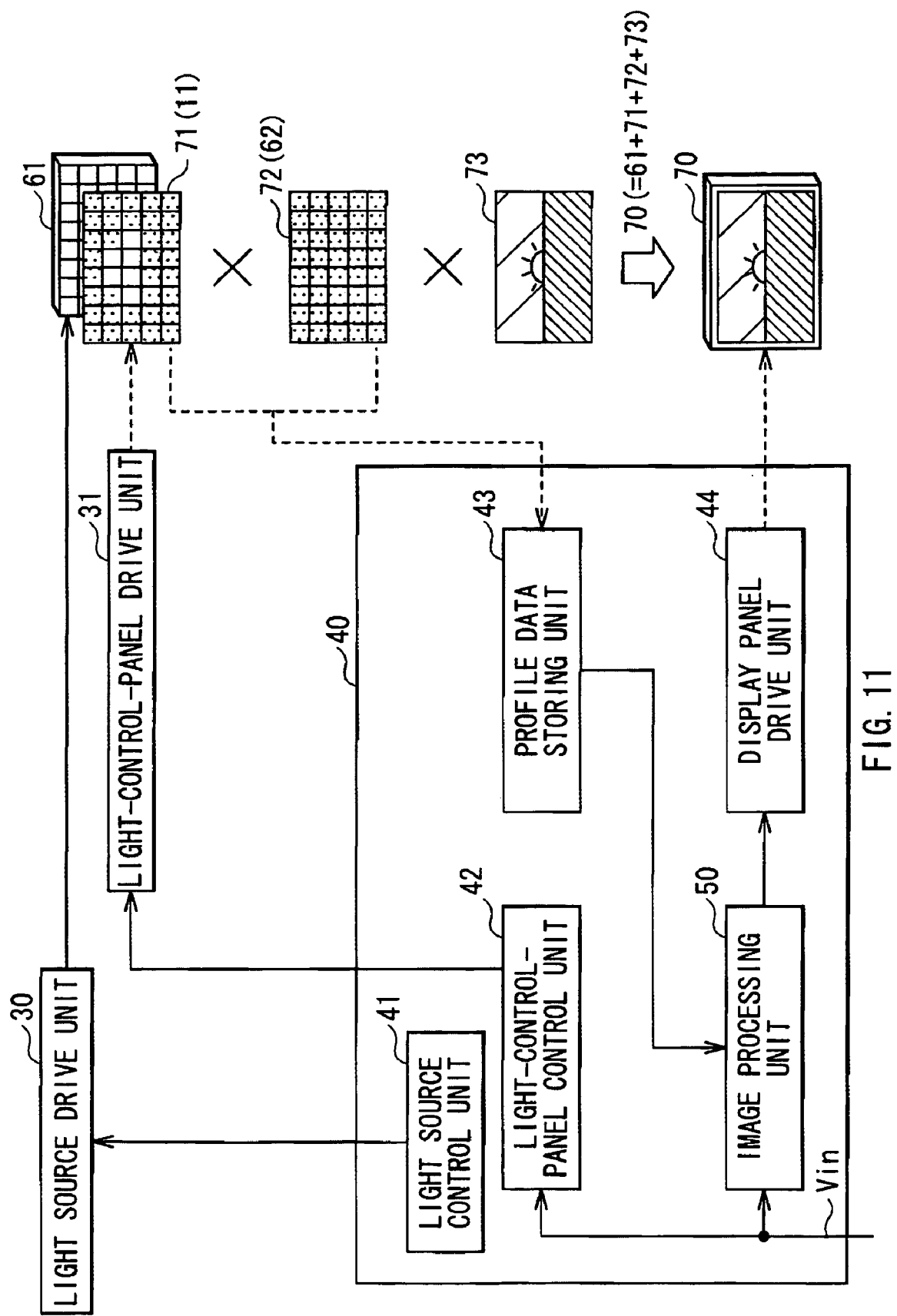
FIG. 11 is a block diagram showing a circuit configuration of the display apparatus in the first embodiment of the invention.

FIG. 11 shows a circuit configuration example of a control system and a drive system in the display apparatus.

The display apparatus has a light source drive unit 30 for driving the light source 1 of the light source unit 61, a light-control-panel drive unit 31 for driving the liquid crystal light control panel 11 of the light source unit 61, and a control unit 40 for performing a signal process on the input video signal Vin and controlling the units.

The control unit 40 has a light source control unit 41 for controlling the light source drive unit 30, a light-controlpanel control unit 42 for controlling the light-control-panel drive unit 31, and a profile data storing unit 43 for storing profile data to be described later (luminance distribution data). The control unit 40 also has an image processing unit 50 for correcting luminance on the input video signal Vin on the basis of the profile data stored in the profile data storing unit 43 and generating a proper image displayed on the liquid crystal display panel 70, and a display panel drive unit 44 for driving the liquid crystal display panel 70 with a proper gamma value on the basis of an output signal from the image processing unit 50.

In the embodiment, a profile data storing unit 45 corresponds to one of examples of "storing section" in the present invention. The image processing unit 50 corresponds to a concrete example of "correcting section" in the present invention.

The "profile data" denotes data of the degree of partial darkness (the decreasing degree of luminance or luminance distribution) when the backlight 60 is partially driven. Concretely, for example, data of the decreasing degree of luminance (luminance distribution) when only a part of the plurality of partial light emission regions 66 is made dark (when the transmission light amount in a part of the plurality of division regions of the liquid crystal light control panel 11 is regulated as shown in FIGS. 7 to 9) in the light source unit 61 is obtained in a plurality of patterns. The data is stored as profile data in the profile data storing unit 43. The image processing unit 50 performs proper luminance correction on the input video signal Vin using such data of the luminance distribution. Consequently, a video image is properly displayed in the liquid crystal panel 70.

Figure 12:
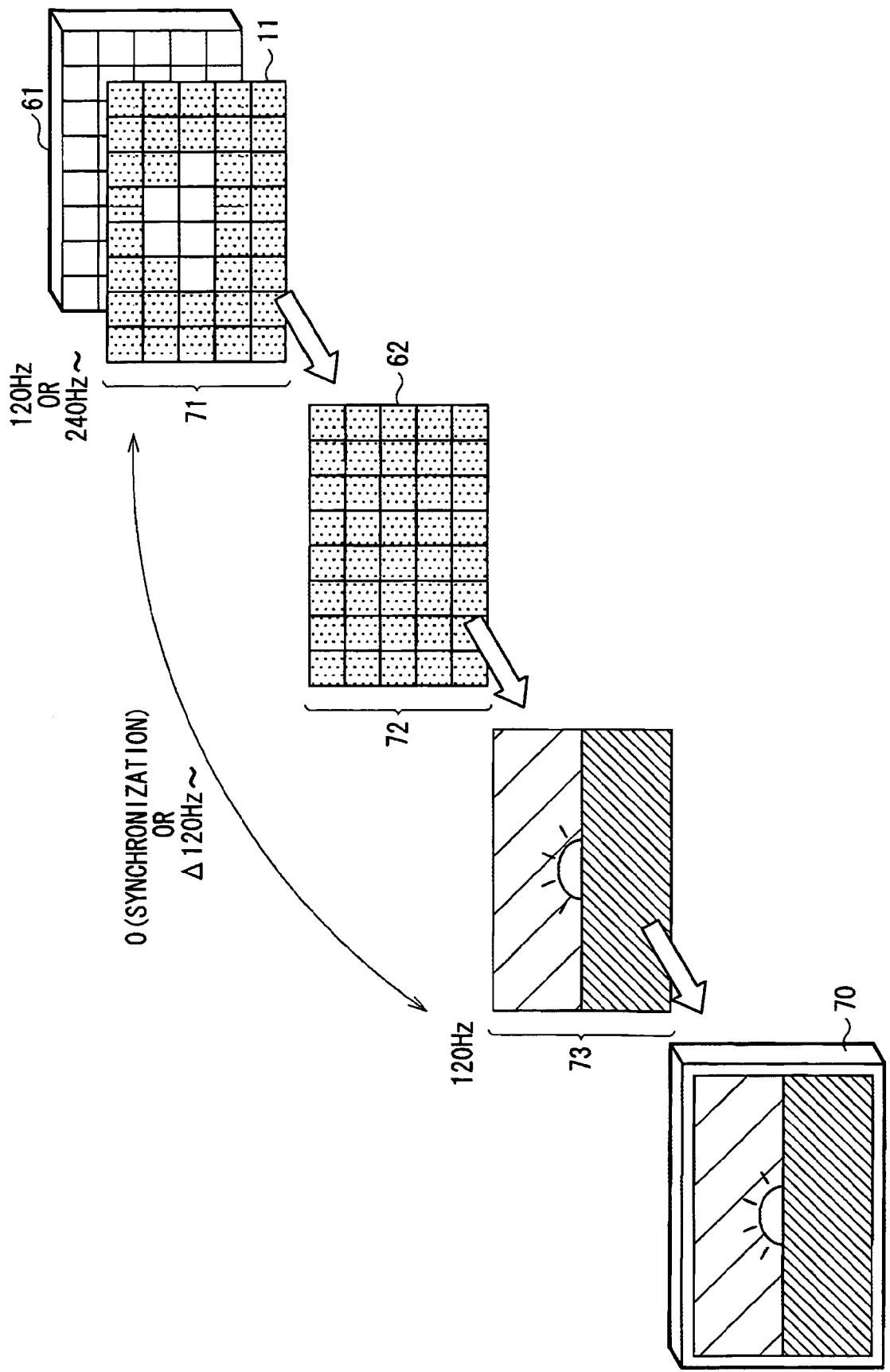
FIG. 12 is an explanatory diagram showing the relation of drive frequencies of a light source part (liquid crystal light control panel) and a liquid crystal display panel.

FIG. 12 shows the relation of drive frequencies of the liquid crystal light control panel 11 of the light source unit 60 and the liquid crystal display panel 70. In the display apparatus, a frame rewrite drive frequency for displaying a video image in the liquid crystal display panel 70 and a drive frequency of the liquid crystal light control panel 11 are completely synchronized or the two drive frequencies are set to frequencies in different states and at which no visual beat (flicker) is caused. For example, when the frame rewrite drive frequency of the liquid crystal display panel 70 is 120 Hz, preferably, the drive frequency of the liquid crystal light control panel 11 is the same frequency of 120 Hz and the drive frequencies are perfectly synchronized. Alternatively, it is preferable to set a drive frequency of an integral multiple of Δ120 Hz (for example, 240 Hz or the like). It prevents occurrence of a phase shift in the operation of the liquid crystal light control panel 11 with respect to the start timing of each frame in the liquid crystal display panel 70.

Next, the contrast of the whole display apparatus and the contrast necessary for the backlight 60 (in the embodiment, substantially, the contrast of the liquid crystal light control panel 11) will be described.

For example, when it is assumed that the display apparatus is used for a television, there is a state in which white is displayed in the entire screen. This state will be called total white display. In this case, approximately 600 cd/m² is average luminance in the industry. The lowest luminance in the case where black is displayed in the liquid crystal display panel 70 is approximately 0.6 cd/m² when the contrast ratio is 1000:1. If the luminance of the backlight 60 is made ¹⁄₁₀₀, the luminance at the time of black display in the entire display apparatus is about 0.006 cd/m² which is ¹⁄₁₀₀. Therefore, the contrast ratio of the display apparatus as a whole is 100,000:1 with respect to the ratio between the luminance of about 0.006 cd/m² in the black display and the luminance 600 cd/m² in the total white display in which 100% of the backlight 60 is turned on. The luminance is sufficient for the television use.

From the above viewpoint, the contract ratio required in the backlight 60 is, for example, about 100:1. In the embodiment, the contrast ratio of the backlight 60 is substantially determined by the performance of the liquid crystal light control panel 11. Therefore, the contrast ratio necessary for the liquid crystal light control panel 11 is, for example, about 100:1. That is, the liquid crystal light control panel 11 does not require a high contrast ratio unlike the normal liquid crystal display panel. Consequently, in the embodiment, a transmission light amount ratio CR of the pair of polarizers 2A and 2B as components of the liquid crystal light control panel 11 is intentionally set to be lower than that of the normal liquid crystal display panel. To set the transmission light amount ratio CR into a predetermined range, the polarization degree of the pair of polarizers 2A and 2B is optimized by being intentionally, in a permissible range, deteriorated (decreased more than the normal liquid crystal display panel). By intentionally deteriorating the polarization degree, the contrast ratio becomes lower than that of the normal liquid crystal display panel, but the transmittance improves. As a result, while suppressing insertion loss (light transmission loss) which occurs when the liquid crystal light control panel 11 is disposed, the light amount is adjusted.

Transmittance T of natural light through the single polarizer 2A (or polarizer 2B) is defined by the following equation. With reference to FIGS. 13, 14, and FIGS. 15A and 15B, the transmittance T will be described. Although the polarizer 2A will be described below, the polarizer 2B is the same.

$$T=(t_1+t_2)/2 \quad (1)$$

Figure 13:
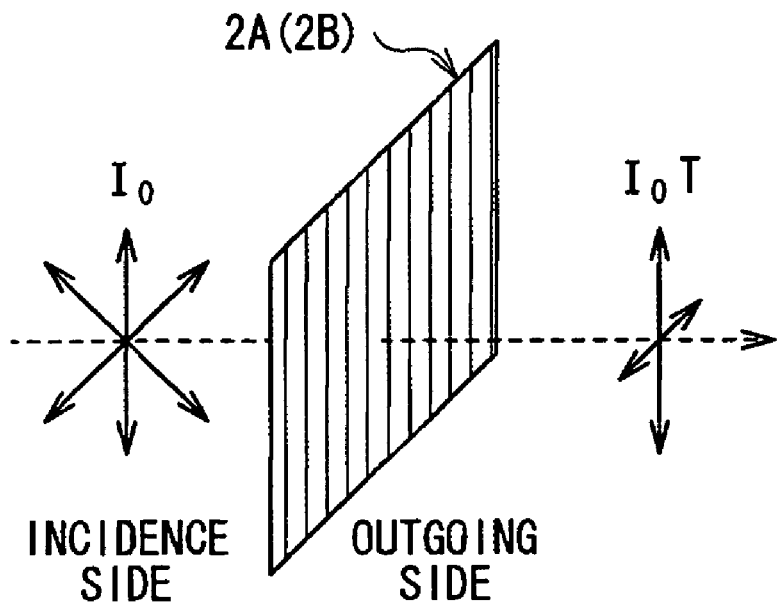
FIG. 13 is an explanatory diagram of transmittance T of natural light through single polarizer.
Figure 14:
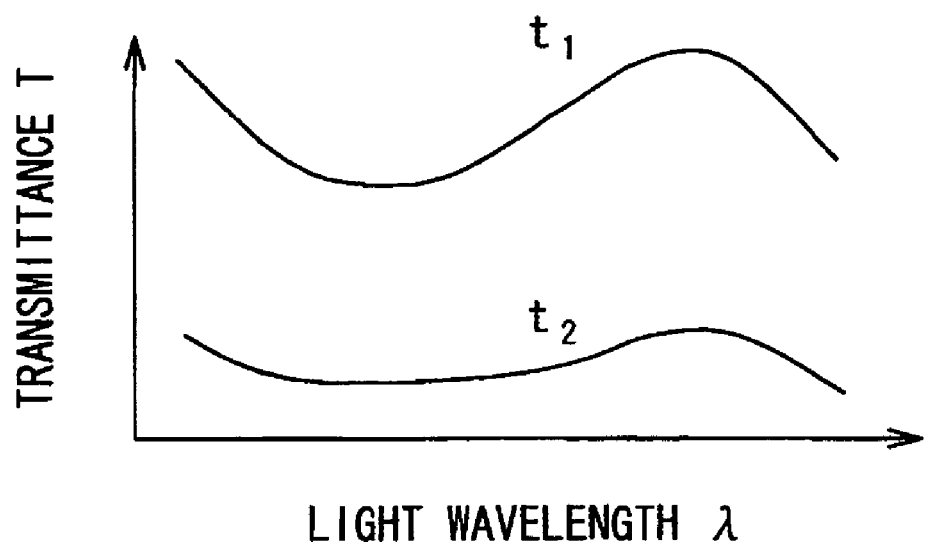
FIG. 14 is an explanatory diagram showing the relation of transmittance to wavelength in a single polarizer.
Figure 15A:
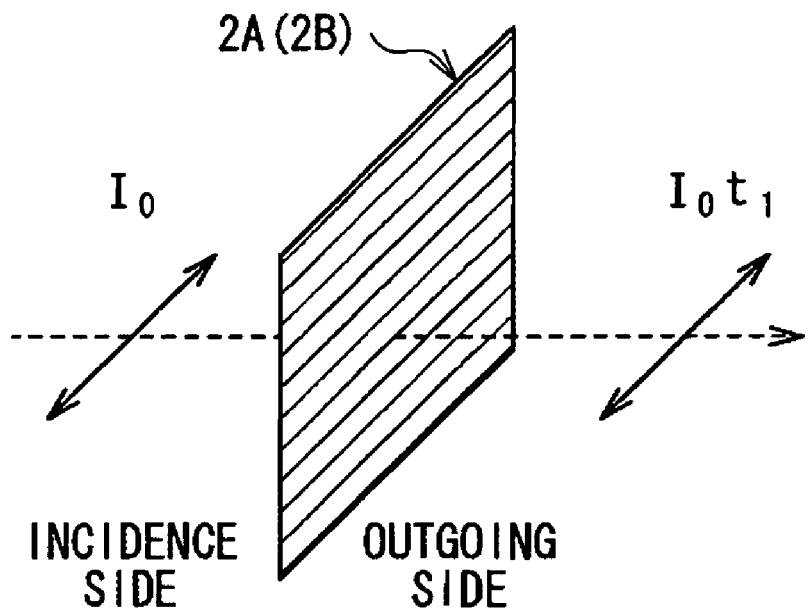
FIG. 15A is an explanatory diagram of parallel transmittance t1 of polarization light to a single polarizer.
Figure 15B:
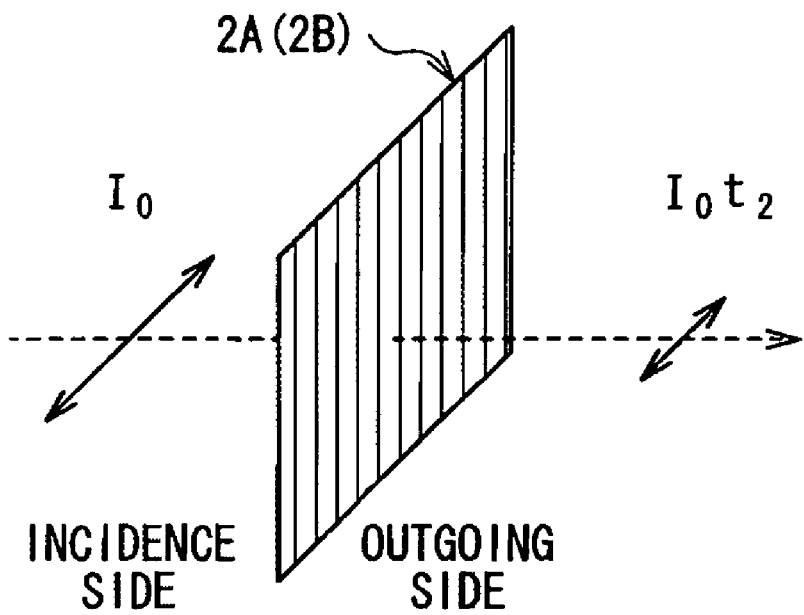
FIG. 15B is an explanatory diagram of orthogonal transmittance t2.

As shown in FIG. 13, natural light which is incident with intensity $I_0$ passes through the polarizer 2A having the transmittance T and the intensity changes to $I_0T$. It is considered that the incident light is made of two linearly-polarized components; a component parallel with the polarization axis of the polarizer 2A (FIG. 15A) and a component orthogonal to the polarization axis (FIG. 15B). The transmittance of the single polarizer 2A of the parallel component is set as parallel transmittance t1. The transmittance of the single polarizer 2A of the orthogonal component is set as orthogonal transmittance t2. FIG. 14 shows the relation between the parallel transmittance t1 and the orthogonal transmittance t2 at wavelengths in the single polarizer.

The transmission light amount ratio CR in the case of using, as a pair, the polarizers 2A and 2B having the transmittances t1 and t2 is defined by the following equation.

$$CR=T_{para}/T_{cross} \quad (2)$$

$$T_{cross}<T_{para} \quad (3)$$

Figure 16A:
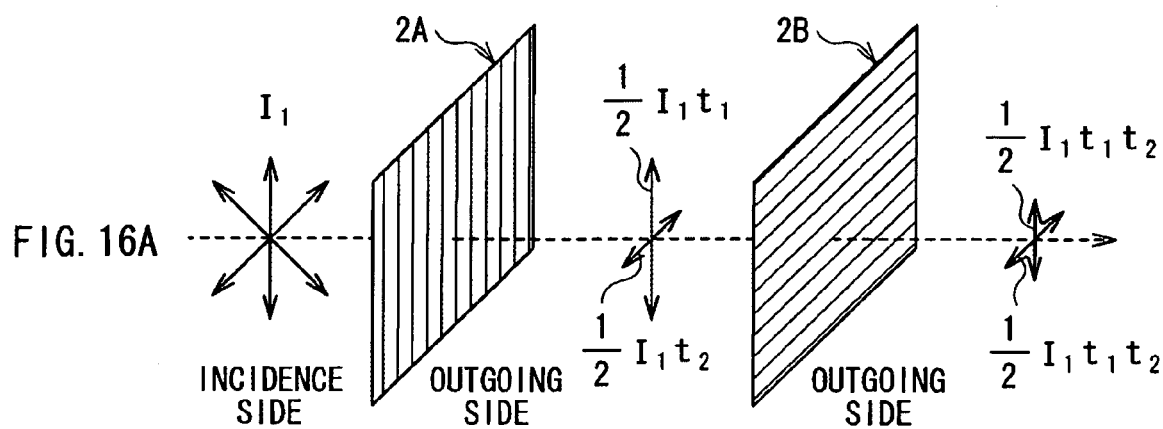
FIGS. 16A and 16B are explanatory diagrams of transmittance in crossed nicols arrangement and parallel nicols arrangement, respectively, of natural light through a pair of polarizers.

$T_{cross}$ denotes, as show in FIG. 16A, transmittance of natural light in a state where the pair of polarizers 2A and 2B is disposed in crossed nicols arrangement. In the case where natural light which is incident with intensity $I_1$ passes through the pair of polarizers 2A and 2B in the crossed nicols state, the following equations are satisfied.

$$I_1t_1t_2/2+I_1t_1t_2/2=I_1t_1t_2 \quad (4)$$

$$T_{cross}=t_1t_2 \quad (5)$$

Figure 16B:
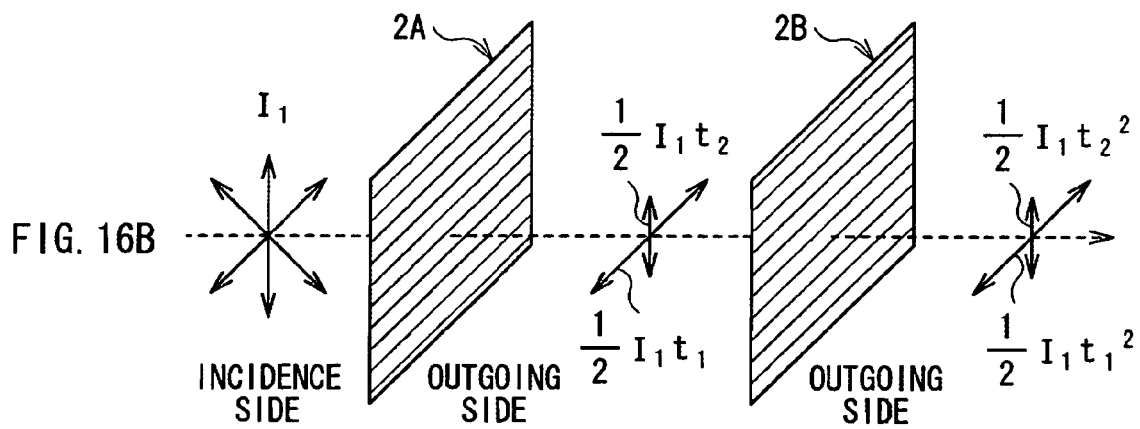

$T_{para}$ denotes, as show in FIG. 16B, transmittance of natural light in a state where the pair of polarizers 2A and 2B is disposed in parallel nicols arrangement. In the case where natural light which is incident with intensity $I_1$ passes through the pair of polarizers 2A and 2B in the parallel nicols state, the following equations are satisfied.

$$I_1 t_1^2/2 + I_1 t_2^2/2 = I_1(t_1^2 + t_2^2)/2 \quad (6)$$

$$T_{para} = (t_1^2 + t_2^2)/2 \quad (7)$$

Using $T_{cross}$ and $T_{para}$, the pair of polarizers 2A and 2B are defined by the following equation (8).

$$\text{Polarization degree} = \sqrt{(T_{para} - T_{cross})/(T_{para} + T_{cross})} \quad (8)$$

where $\sqrt{}$ denotes the square root of $(T_{para} - T_{cross})/(T_{para} + T_{cross})$.

Figure 17:
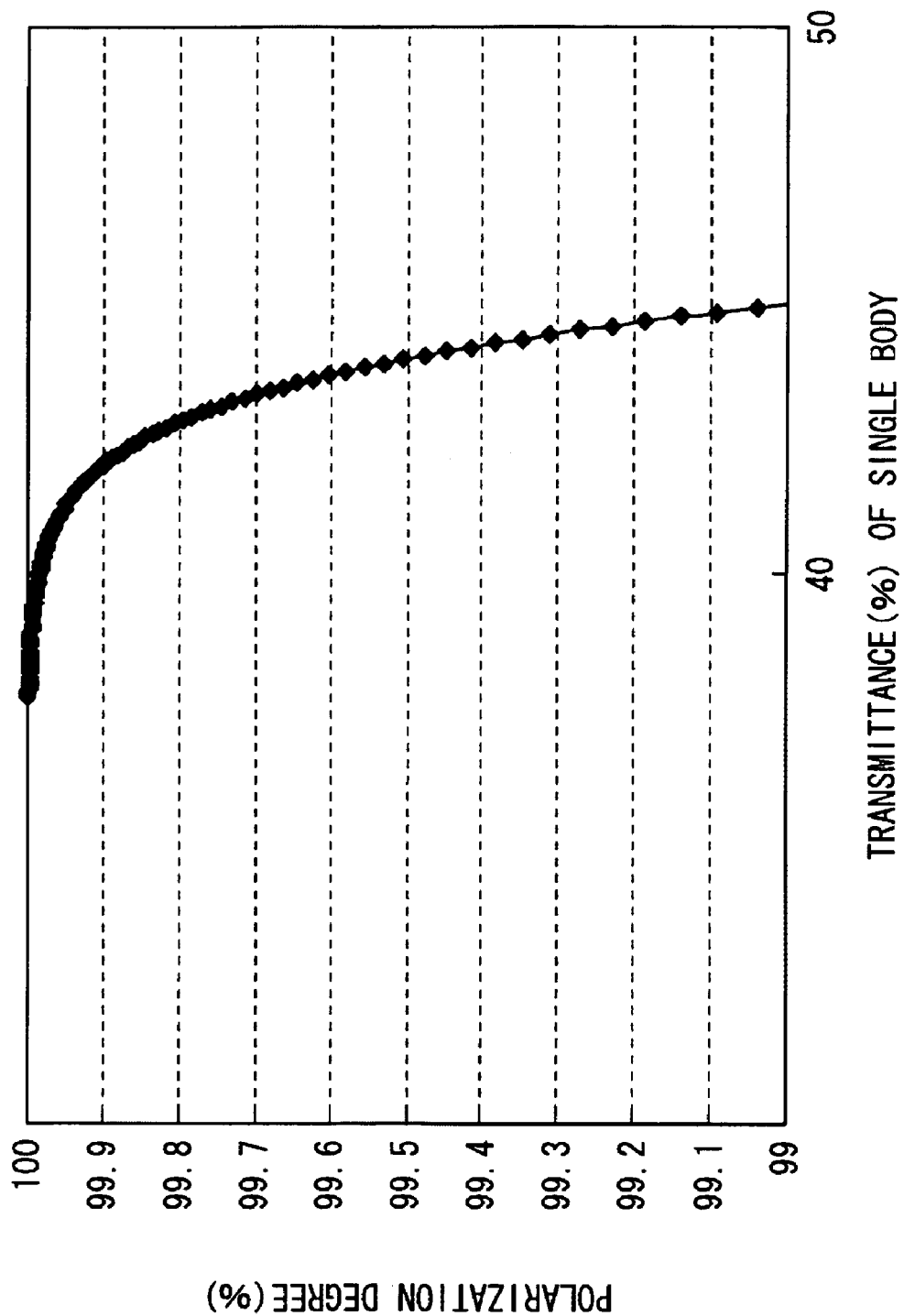
FIG. 17 is an explanatory diagram showing the relation of polarization degrees of a pair of polarizers with respect to the transmittance of a single polarizer.

FIG. 17 shows a characteristic example of the polarization degree (vertical axis) of a pair of polarizers with respect to the transmittance T (horizontal axis) of a single polarizer. As shown in FIG. 17, generally, by decreasing the polarization degree of the pair of polarizers, the transmittance T of the single polarizer is increased.

Figure 18:
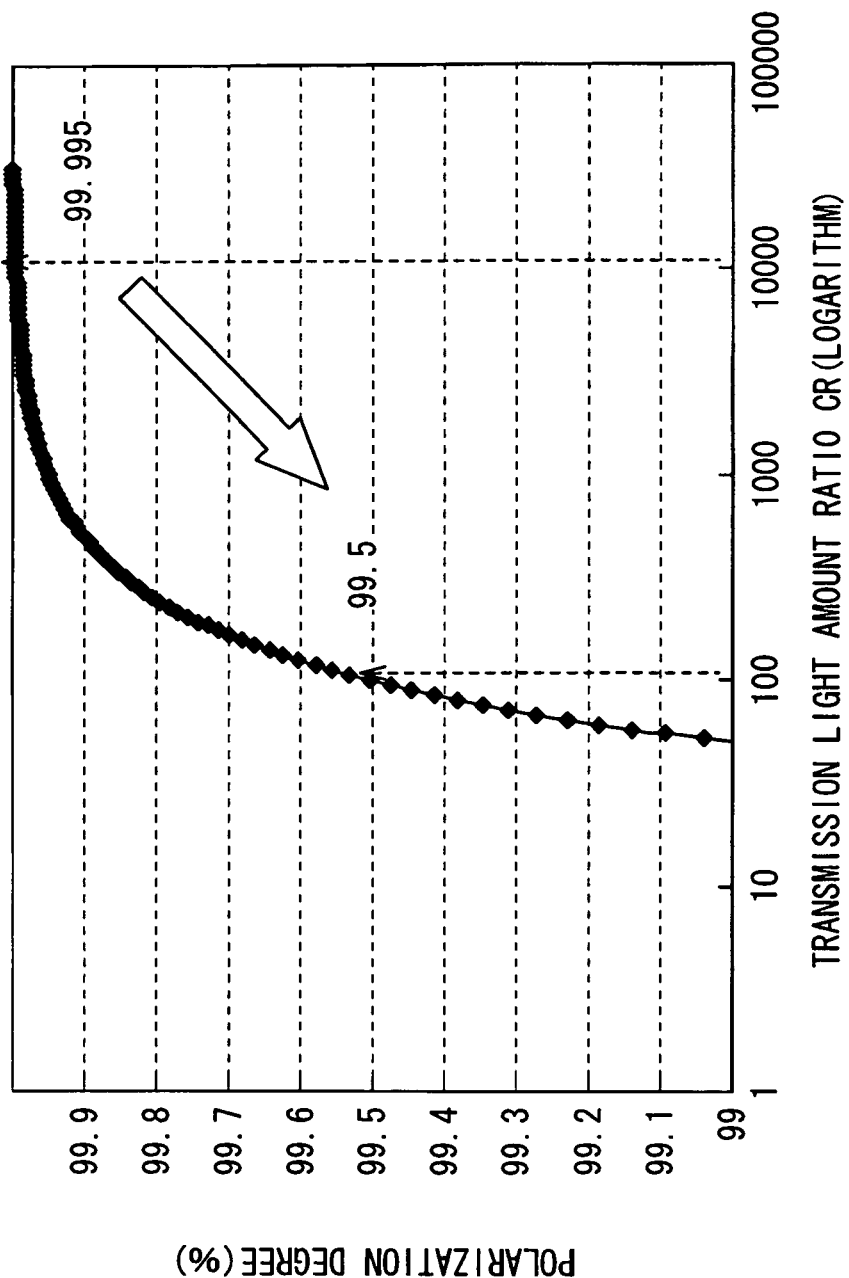
FIG. 18 is an explanatory diagram showing the relation of polarization degrees to a transmission light amount ratio of the pair of polarizers.

FIG. 18 shows a characteristic example of the polarization degree (vertical axis) with respect to the transmission light amount ratio CR (horizontal axis) of a pair of polarizers. As shown in FIG. 18, generally, by decreasing the polarization degree of the pair of polarizers, the transmission light amount ratio CR decreases. In the characteristic example of FIG. 18, when the polarization degree is 99.995 (%), the transmission light amount ratio CR is 10,000. By decreasing the polarization degree to 99.5 (%), the transmission light amount ratio CR is decreased to 100.

Figure 19:
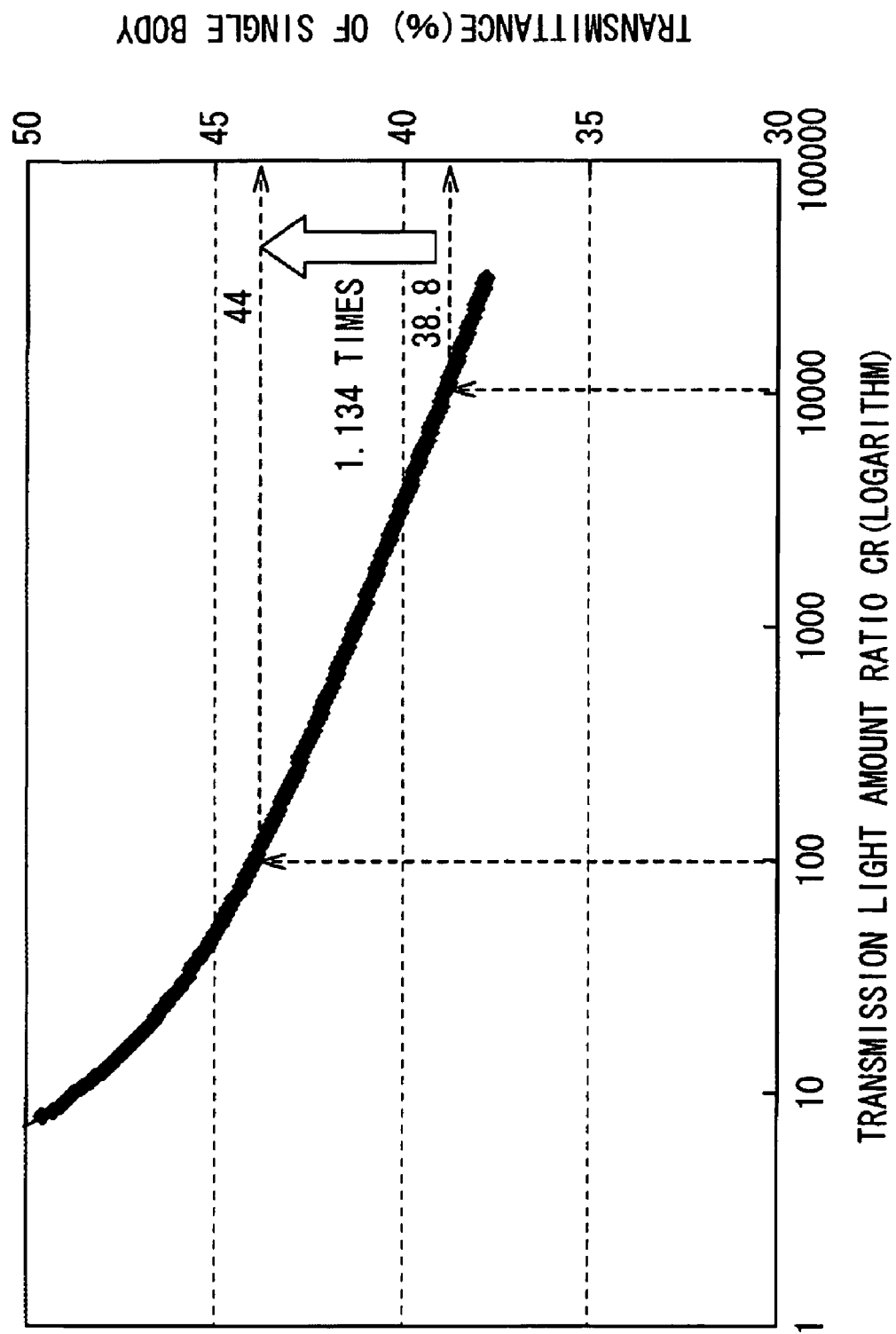
FIG. 19 is an explanatory diagram showing the relation of transmittance of a single polarizer with respect to the transmission light amount ratio of the pair of polarizers.

FIG. 19 shows a characteristic example of the transmittance T (vertical axis) of a single polarizer with respect to the transmission light amount ratio CR (horizontal axis) of a pair of polarizers. As shown in FIG. 19, generally, by decreasing the transmission light amount ratio CR of the pair of polarizers, the transmittance T of the single polarizer is increased. In the characteristic example of FIG. 19, when the transmission light amount ratio CR is 10,000, the transmittance T is 38.8 (%). By decreasing the transmission light amount ratio CR to 100, the transmittance T is increased by 1.134 times to 44 (%).

Figure 20:
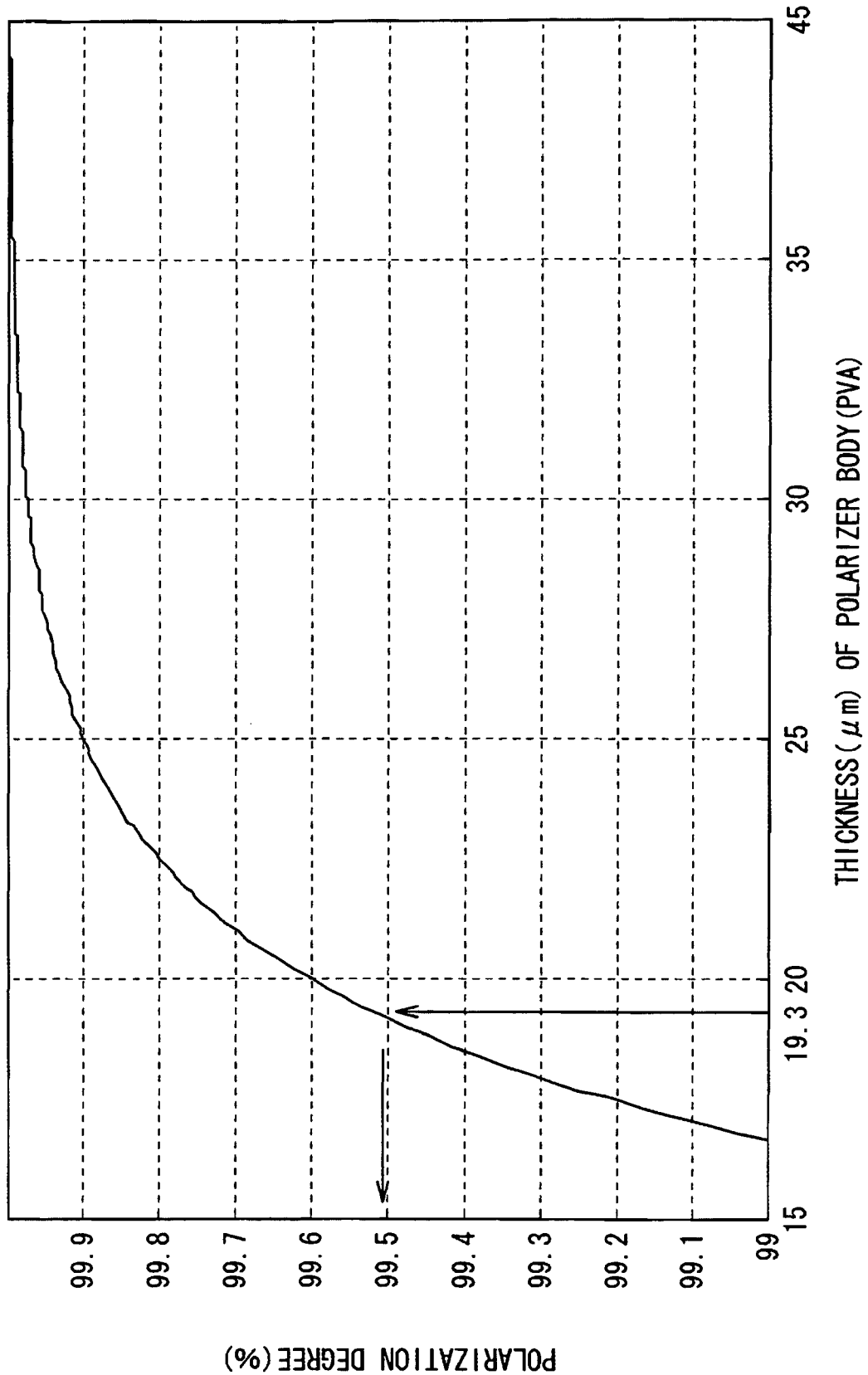
FIG. 20 is an explanatory diagram showing the relation of polarization degrees of a pair of polarizers to thickness of an entire polarizer (PVA).

FIG. 20 shows the relation of the polarization degree (vertical axis) of a pair of polarizers with respect to thickness (horizontal axis) of a single polarizer (PVA). As shown in FIG. 20, generally, by decreasing the thickness of the polarizer body, the polarization degree of the pair of polarizers is decreased. In the characteristic example of FIG. 20, by setting the thickness of the polarizer body to about 19.3 μm, the polarization degree is decreased to about 99.5 (%).

From the characteristics shown in FIGS. 17 to 20, in the configuration of the liquid crystal light control panel 11 shown in FIG. 5, in the case where the pair of polarizers 2A and 2B has the configuration shown in FIG. 6, by setting the thickness of the PVA layer 5 as the polarizer body layer to thickness D2 smaller than thickness D1 used for a normal liquid crystal display panel, the polarization degree of the pair of polarizers 2A and 2B is intentionally deteriorated. In this case, while increasing the transmittance T of the single polarizer, the transmission light amount ratio CR is decreased. In the embodiment, for example, the contrast ratio necessary for the liquid crystal light control panel 11 is about 100:1 as described above. Therefore, by optimizing the polarization degree of the pair of polarizers 2A and 2B, the transmission light amount ratio CR is optimized to about 100 as shown in FIGS. 17 to 20.

In the above description, the case of setting the polarization degree to 99.5 (%) and setting the transmission light amount ratio CR of the pair of polarizers 2A and 2B of the liquid crystal light control panel 11 to 100 has been described. However, the value of the transmission light amount ratio CR is not limited to the above. The value of the transmission light amount ratio CR may be properly determined, for example, according to quality necessary for the display apparatus. The polarization degree of the pair of polarizers 2A and 2B may be optimized to 99.90 (%) or less, so that the transmission light amount ratio CR lies in a desired range.

FIG. 21 shows an example of numerical values proving that, by actually optimizing the polarization degree, the transmittance of the entire liquid crystal light control panel 11 in the configuration of FIG. 5 is improved. As a comparative example, transmittance in the case where the display apparatus is used as a general display apparatus is also shown. As shown in FIG. 21, as compared with the case where the display apparatus is used as a general display apparatus, the transmittance of the entire panel is improved by about 28%.

As described above, in the display apparatus of the embodiment, by regulating the transmission amount of light emitted from the light source 1 by the liquid crystal light control panel 11, the light intensity of light emitted from the light source 1 is locally decreased in the plane. Consequently, for example, without increasing the number of light sources or without controlling the light emission amount of the light source itself, the light intensity is locally decreased at low cost without depending on the configuration of the light source itself. By realizing optimization by intentionally, in a permissible range, deteriorating (decreasing) the polarization degree of the pair of polarizers in the liquid crystal light control panel more than that of a normal liquid crystal display panel, the transmission light amount ratio CR is suppressed in a predetermined range required for light control. Therefore, while realizing a contrast ratio lower than that of the normal liquid crystal display panel, the transmittance is improved. As a result, while suppressing insertion loss which occurs when the liquid crystal light control panel 11 is disposed, the light amount is adjusted.

Second Embodiment

A second embodiment of the present invention will now be described. The same reference numerals are designated to the substantially same components as those of the first embodiment and their description will not be repeated.

Figure 22:
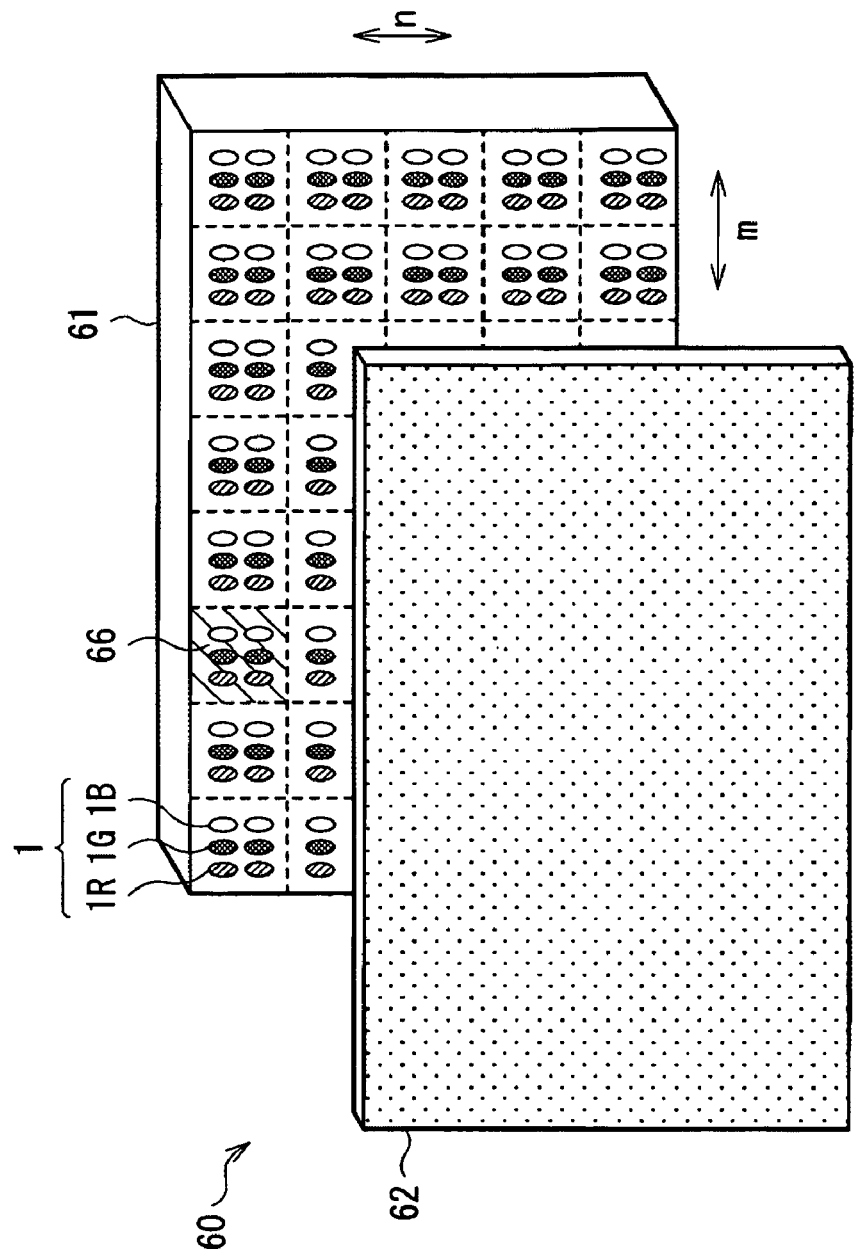
FIG. 22 is a perspective view showing a schematic configuration of an illuminating apparatus in a second embodiment of the present invention.

In the first embodiment, the case of using stick-shaped line light sources such as CCFLs as the light source 1 has been described. As the light source 1, point light sources may be used. For example, as shown in FIG. 22, as the light source 1, a combination of a red LED 1R for emitting red light, a green LED 1G for emitting green light, and a blue LED 1B for emitting blue light may be disposed in each of the partial light emission regions 66 in the light source unit 61. In this case, by additive color mixing of those colors, white light is obtained. At least one LED of each color is disposed in each of the partial light emission regions 66.

Other Embodiments

The present invention is not limited to the foregoing embodiments but other modifications are possible.

For example, in the first embodiment, the case of optimizing the polarization degree by optimizing the thickness of the pair of polarizers 2A and 2B of the liquid crystal light control panel 11 has been described. However, the method of optimizing the polarization degree is not limited to the case. For example, optimization may be performed by increasing or decreasing the impregnation amount of iodine with which the PVA layer 5 (FIG. 6) as the polarizer body layer is impregnated while leaving the thickness.

It should be understood by those skilled in the art that various modifications, combinations, sub-combinations and alterations may occur depending on design requirements and other factors insofar as they are within the scope of the appended claims or the equivalents thereof.

What is claimed is:

1. An illuminating apparatus used as a backlight of a display apparatus having a liquid crystal display panel with a pair of first polarizers, comprising:
   a light source; and
   a liquid crystal light control panel having a pair of second polarizers and suppressing amount of transmission of light from the light source, so as to allow the light from the light source to have such a light intensity distribution along a plane that light intensity is locally reduced,
   wherein each of the first polarizers has a first polarizing layer having a first thickness and each of the second polarizers has a second polarizing layer having a second thickness, in which the second thickness has a value less than that of the first thickness so as to cause a polarization degree of the second polarizers to be less than that of the first polarizers such that the transmission light amount ratio of the second polarizers is lower than that of the first polarizers.

2. The illuminating apparatus according to claim 1, wherein the polarization degree in the second polarizers is about 99.5 (%) or less to control the transmission light amount ratio of the second polarizers to be lower than that of the first polarizers.

3. The illuminating apparatus according to claim 1, wherein
   the polarizing layer of each of the second polarizers is impregnated with iodine and,
   impregnation amount of iodine in each of the second polarizers is optimized to control the transmission light amount ratio of the second polarizers to be lower than that of the first polarizers.

4. The illuminating apparatus according to claim 1, wherein
   the liquid crystal light control panel is divided into a plurality of divisional regions in a two-dimensional matrix, and
   the amount of transmission of light from the light source is selectively suppressed on a divisional region unit basis to allow the light intensity in the plane to be locally reduced on the divisional region unit basis.

5. A display apparatus comprising:
   an illuminating device including a light source and a liquid crystal light control panel; and
   a display section including a liquid crystal display panel with a pair of first polarizers and displaying a video image based on an input video signal through using illumination light from the illuminating apparatus as display light, wherein
   the liquid crystal light control panel has a pair of second polarizers and suppressing amount of transmission of light from the light source, so as to allow the light from the light source to have such a light intensity distribution along a plane that light intensity is locally reduced, and
   each of the first polarizers has a first polarizing layer having a first thickness and each of the second polarizers has a second polarizing layer having a second thickness, in which the second thickness has a value less than that of the first thickness so as to cause a polarization degree of the second polarizers to be less than that of the first polarizers such that transmission light amount ratio of the second polarizers is lower than that of the first polarizers.

6. The display apparatus according to claim 5, wherein
   the liquid crystal light control panel is divided into a plurality of divisional regions in a two-dimensional matrix, and
   the amount of transmission of light from the light source is selectively suppressed on a divisional region unit basis to allow the light intensity in the plane to be locally reduced on the divisional region unit basis in accordance with the input video signal.

7. The display apparatus according to claim 6, further comprising:
   a storing section storing light intensity distribution data which represents the light intensity distribution which appears when the amount of transmission of light from the light source is selectively suppressed in some of the plurality of divisional regions in the liquid crystal light control panel; and
   a correcting section correcting luminance of the input video signal on the basis of the light intensity distribution data stored in the storing section and generating a video image to be displayed on the display section.

8. The display apparatus according to claim 5, wherein a frame frequency for displaying a video image in the display section and a drive frequency of the liquid crystal light control panel are completely synchronized with each other, or the two frequencies have completely different values so that no visual beat is generated.

* * * * *